US011265423B1

(12) United States Patent
Liu et al.

(10) Patent No.: US 11,265,423 B1
(45) Date of Patent: *Mar. 1, 2022

(54) DISPLAY DEPENDENT ANALYTICS

(71) Applicant: 8x8, Inc., Campbell, CA (US)

(72) Inventors: Zhishen Liu, Campbell, CA (US); Qing Zhao, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,796

(22) Filed: Jul. 7, 2020

Related U.S. Application Data

(63) Continuation of application No. 16/195,370, filed on Nov. 19, 2018, now Pat. No. 10,708,440, which is a
(Continued)

(51) Int. Cl.
*H04M 7/00* (2006.01)
*H04L 65/1069* (2022.01)
(Continued)

(52) U.S. Cl.
CPC ........ *H04M 7/0084* (2013.01); *H04L 43/045* (2013.01); *H04L 43/0817* (2013.01); *H04L 65/1053* (2013.01); *H04L 65/1069* (2013.01); *H04N 21/00* (2013.01); *H04N 21/25825* (2013.01); *H04N 21/42684* (2013.01);
(Continued)

(58) Field of Classification Search
CPC ............. H04L 65/1053; H04L 65/1069; H04L 43/0817; H04L 43/045; H04N 21/25825; H04N 21/00; H04N 21/64322; H04N 21/4516; H04N 21/4788
See application file for complete search history.

(56) References Cited

U.S. PATENT DOCUMENTS 6,363,065 B1 3/2002 Thornton et al.
6,725,045 B2 4/2004 Oren et al.
(Continued)

FOREIGN PATENT DOCUMENTS

WO 2008089522 A1 7/2008

OTHER PUBLICATIONS

Gerry Blackwell, "Jajah: Free VoIP with a Twist," www.voipplanet.com (Oct. 5, 2006).
(Continued)

*Primary Examiner* — Syed Ali
(74) *Attorney, Agent, or Firm* — Crawford Maunu PLLC

(57) ABSTRACT

Apparatus and methods are disclosed for display-related analysis of call data in an IPBX. In an example embodiment, an apparatus is configured to route data/VoIP calls via a data-communications server. An interface circuit is configured to selected parameters of interest based on capabilities of a set of devices and generate subscription requests to subscribe the devices to the parameters of interest. A processing circuit is configured to generate call summary metrics from call event messages for calls routed by the server and with subscription requests being associated with the parameters of interest. The call summary metrics are evaluated in connection with the parameters of interest as subscribed to by the devices and results of the evaluation are provided to the communication devices.

16 Claims, 6 Drawing Sheets

Related U.S. Application Data continuation of application No. 15/943,520, filed on Apr. 2, 2018, now Pat. No. 10,135,995, which is a continuation of application No. 15/638,767, filed on Jun. 30, 2017, now Pat. No. 9,936,079, which is a continuation of application No. 15/010,285, filed on Jan. 29, 2016, now Pat. No. 9,699,226.

(60) Provisional application No. 62/268,860, filed on Dec. 17, 2015.

(51) Int. Cl.
| | |
|---|---|
| H04L 65/1053 | (2022.01) |
| H04N 21/4788 | (2011.01) |
| H04N 21/00 | (2011.01) |
| H04N 21/45 | (2011.01) |
| H04N 21/426 | (2011.01) |
| H04N 21/443 | (2011.01) |
| H04N 21/643 | (2011.01) |
| H04L 43/045 | (2022.01) |
| H04L 43/0817 | (2022.01) |
| H04N 21/258 | (2011.01) |
| H04M 3/42 | (2006.01) |

(52) U.S. Cl.
CPC ..... *H04N 21/4432* (2013.01); *H04N 21/4516* (2013.01); *H04N 21/4788* (2013.01); *H04N 21/64322* (2013.01); *H04M 3/42314* (2013.01); *H04M 7/009* (2013.01)

(56) References Cited

U.S. PATENT DOCUMENTS

| | | | |
|---|---|---|---|
| 6,782,080 B2 | 8/2004 | Leivo et al. | |
| 6,807,264 B1 | 10/2004 | Booton | |
| 7,647,041 B2 | 1/2010 | Gonsalves et al. | |
| 8,300,634 B2 | 10/2012 | Narayanaswamy | |
| 8,442,191 B1 | 5/2013 | Vasquez et al. | |
| 8,924,465 B1 | 12/2014 | Tunguz-Zawislak | |
| 9,432,519 B1 | 8/2016 | Liu et al. | |
| 9,699,226 B1 | 7/2017 | Liu et al. | |
| 9,924,404 B1 | 3/2018 | Salour et al. | |
| 9,936,079 B1 | 4/2018 | Liu et al. | |
| 10,135,995 B1 | 11/2018 | Liu et al. | |
| 2002/0101860 A1 | 8/2002 | Thornton et al. | |
| 2006/0217112 A1 | 9/2006 | Mo | |
| 2007/0124727 A1* | 5/2007 | Tennyson | H04M 3/306 717/158 |
| 2008/0096553 A1* | 4/2008 | Saksena | H04W 28/06 455/426.2 |
| 2008/0118041 A1 | 5/2008 | Finogenov | |
| 2009/0221265 A1 | 9/2009 | Liu et al. | |
| 2009/0302996 A1* | 12/2009 | Rhee | H02J 13/0086 340/3.32 |
| 2009/0305644 A1* | 12/2009 | Rhee | G08C 17/00 455/73 |
| 2009/0327719 A1 | 12/2009 | Herley | |
| 2010/0146085 A1 | 6/2010 | Van Wie et al. | |
| 2010/0197288 A1 | 8/2010 | Camilleri et al. | |
| 2010/0274893 A1 | 10/2010 | Abdelal et al. | |
| 2011/0069142 A1* | 3/2011 | Ali | H04N 21/6377 348/14.12 |
| 2011/0149950 A1 | 6/2011 | Petit-Huguenin et al. | |
| 2011/0153742 A1* | 6/2011 | Sloop | G08G 1/096716 709/204 |
| 2011/0191417 A1 | 8/2011 | Rathod | |
| 2011/0202645 A1 | 8/2011 | Abdelal et al. | |
| 2011/0249658 A1 | 10/2011 | Wohlert et al. | |
| 2011/0296459 A1 | 12/2011 | Medina et al. | |
| 2011/0320586 A1* | 12/2011 | Maltz | G06F 11/3495 709/224 |
| 2012/0128135 A1 | 5/2012 | Sun | |
| 2012/0163240 A1* | 6/2012 | Gardell | H04L 63/306 370/259 |
| 2013/0151996 A1 | 6/2013 | Nario et al. | |
| 2013/0238751 A1 | 9/2013 | Raleigh et al. | |
| 2013/0294443 A1 | 11/2013 | Kahn | |
| 2014/0215082 A1 | 7/2014 | Backholm | |
| 2017/0187500 A1* | 6/2017 | Kutz | H04L 5/0048 |
| 2019/0281049 A1 | 9/2019 | Scheller et al. | |
| 2020/0050739 A1 | 2/2020 | Wiacek et al. | |

OTHER PUBLICATIONS

Jeff Goldman, "TalkPlus: a PBX for Mobil Phones," www.voipplanet.com (Aug. 16, 2007).

\* cited by examiner

DISPLAY DEPENDENT ANALYTICS

OVERVIEW

A private branch exchange (PBX) routes calls between a service provider network (e.g., a cellular network or a public standard telephone network (PSTN)) and a plurality of end-users having respective telephone extensions in a private telecommunication network. One type of PBX, known as an Internet Protocol PBX (IPBX), routes calls between a service provider network and a plurality of Voice over Internet Protocol (VoIP)-enabled devices on an IP network using VoIP, in which each device is assigned a respective telephone extension.

SUMMARY

Apparatus and methods concerning analysis of call data in an IPBX are disclosed. In some example embodiments, an apparatus includes a call data processing circuit communicatively coupled to an IPBX server configured to route VoIP calls for a plurality of end-users. The end users have respective VoIP-enabled circuit devices (aka, "circuit-based endpoints") communicatively coupled to the IPBX server via a communications network. The call data processing circuit includes a first processing circuit configured to generate call related data (such as call summary metrics) from calls or call event messages as received from the IPBX server for calls routed by the IPBX server. The call data processing circuit also includes a second processing circuit configured to receive the subscription-related data for the VoIP-enabled circuit devices (e.g., from an interface circuit communicatively connected thereto). In more specific example embodiments, the subscription-related data includes subscription requests, and each such subscription request indicates: an identifier of the subscribing device and parameters of interests. In response to the subscription request, the second processing circuit subscribes the device to the selected set of parameters. For each parameter (or unique parameter) of interest subscribed to by one or more of the devices, the second processing circuit evaluates the call summary metrics for the parameter of interest to generate a respective set of result data. The second processing circuit communicates the set of result data to devices that are subscribed to the parameter of interest.

In some example embodiments, the apparatus also includes an interface circuit configured to receive data messages (e.g., session login, settings, and/or control messages) indicative of user-interface or display capabilities from the VoIP-enabled circuit devices. The interface circuit determines respective parameters of interest for the VoIP-enabled circuit devices based on display capabilities of the devices. Alternatively or additionally, in some example embodiments, the received data messages may specify one or more parameters of interest selected by the VoIP-enabled circuit devices based on display capabilities. The interface circuit generates subscription requests to cause the second processing circuit to subscribe the VoIP-enabled circuit devices to the determined parameters of interest.

In some embodiments, methods are provided for performing display-dependent analysis of call data in an IPBX. Call event messages are received from an IPBX server for calls routed by an IPBX server. Call summary metrics are generated from the received call event messages. Data messages indicative of display capabilities of a set of devices are received. Respective parameters of interests are determined for the set of devices based on the display capabilities of the devices. Subscription requests are generated to subscribe the devices to the parameters of interest. Each subscription request indicates an identifier of one of the set of devices from which the subscription request was received and the parameters of interest. In response to receiving a subscription request, a call data processing circuit subscribes the indicated device to the indicated parameters of interest. The call summary metrics are evaluated for each parameter of interest subscribed to by one or more of the set of devices. Results of the evaluation for the parameters of interest are communicated to devices that are subscribed to the parameter of interest.

BRIEF DESCRIPTION OF THE FIGURES

The disclosure may be more completely understood in consideration of the following detailed description of various embodiments of the disclosure, in connection with the accompanying drawings in which.

Figure 1:
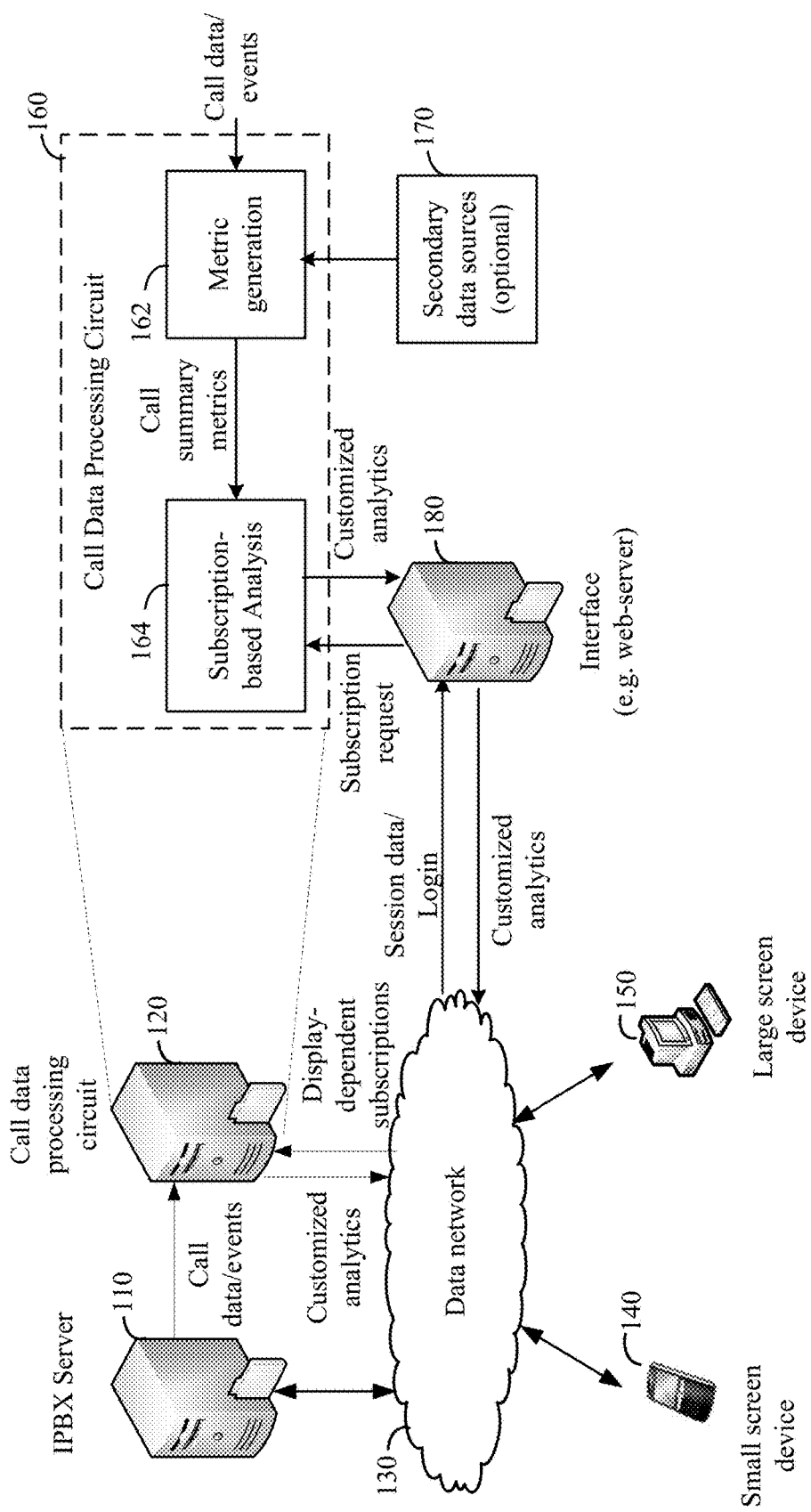
FIG. 1 shows an example communication system having an IPBX configured in accordance with one or more embodiments.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods utilizing an IPBX server to provide communication services for a plurality of end-users in a network. In some implementations, aspects of the present disclosure have been shown to be particularly beneficial when used in the context of routing of communication in a IPBX by remote receptions via a web-based interface. While the present disclosure is not intended to be necessarily limited thereto, these types of implementations are used to exemplify and illustrate pertinent aspects of the present disclosure.

Accordingly, certain aspects of the present disclosure are applicable to apparatuses (such as devices and systems) and methods for analyzing data surrounding the activities of an IPBX server. In some embodiments, data is gathered from an IPBX server configured to route calls for a plurality of end-users in a communication network. In some implementations, the IPBX server generates call event messages to indicate changes in statuses of calls to call participants. Call event messages may include for example, ring/alert, call connected, call disconnected, call on-hold, call parked, call reconnected, call transferred, and/or calls merged/conferenced. The call event messages may be provided to various end-users and/or applications in addition to end-users who are participants in a call. While the disclosed embodiments are not necessarily limited to such applications, various aspects of the present disclosure may be appreciated through a discussion of various examples using this context.

In one or more embodiments, an apparatus includes a call data processing circuit having a first processing circuit configured to generate call summary metrics for calls routed by an IPBX, based on the call event messages received from the IPBX. The call summary metrics indicate respective sets of call data for participants of the calls routed by the IPBX server. For example, the call summary metrics may indicate for each of the call participants: a number of incoming calls, a number of outgoing calls, a number of answered calls, a number of missed calls, a number of abandoned calls, average call time, average time to answer, average on-hold time, or various combinations thereof. In some embodiments, the first processing circuit may also generate data metrics characterizing other data parameters (e.g., address events for devices, statuses/presence of end-users, and/or use of network application) that are monitored in an IPBX network or received from secondary data sources. Secondary data sources may include, for example, applications utilized by the end-users associated with the organization, internet-connected data repositories, and/or third-party data subscription services.

The apparatus includes an interface circuit communicatively coupled to the call data processing circuit and to a set of devices that are configured to display analytics data generated by the call data processing circuit. The interface circuit operates a presentation layer over the analytics operations provided by the call data processing circuit. In some embodiments, the interface circuit provides a web-based portal to communicate data between the devices and the call data processing circuit. For instance, the interface circuit may include a webserver that allows for access using a web browser application. In some implementations, the interface circuit may utilize one or more authentication methods to restrict access to analytics data to a set of authorized users. The interface circuit is configured to receive data messages indicative of display capabilities from a set of devices communicatively connected to the call data processing circuit. Display capabilities may include for example, screen size, refresh rate, screen resolution, and/or communication bandwidth. For ease of explanation, examples may be primarily discussed with reference to screen size. The interface circuit is configured to determine a respective sets of parameters of interest for the set of devices based on the display capabilities. The interface circuit generates subscription requests to subscript the devices to the determined parameters of interest. Each subscription request may specify, for example, a unique identifier of one of the devices and the set of parameters determined for the device.

The call data processing circuit also includes a second processing circuit configured to receive the subscription requests from the interface circuit and analyze call/data metrics based on the parameters of interest indicated by the subscription requests. In response to a subscription request, the second processing circuit subscribes the device specified in the request to the parameters of interest specified in the request. The second processing circuit analyzes the call summary metrics and/or data metrics for each (unique) parameter of interest having an active subscription. The second processing circuit communicates result data of the analysis to devices that are subscribed to the particular parameters of interest for display. In some embodiments, the result data is communicated to the devices via the interface circuit. In some implementations, the interface circuit is configured to reformat the result data provided to each device based on the display capabilities of the device. For example, the interface circuit may responsively adjust the order, number, or size of analytic components from the result data that are provided to a device, based on the display capabilities of the device. Additionally or alternatively the result data (or a portion thereof) may be communicated to the devices via network connections that bypass the interface circuit.

The devices may responsively display the received result data based on device display capability. For instance, devices may display different UI components to display different subsets of the data. The position or the size of the UI components may be determined based on device display capabilities (e.g., resolution, size, and/or type of display). The analytics data that an application is able to display in a readable format can vary depending on the capabilities of the device executing the application. For example, an application executed on a smartphone may only be able to display a subset of data fields that are displayed when executed on a desktop computer. By generating subscriptions for display dependent parameters of interest, the second processing circuit can avoid unnecessary generation and transmission of data that will not be displayed.

In different embodiments, the parameters of interest to be subscribed to may be selected either by the devices or by the interface circuit. In some implementations, the interface circuit is configured to select the set of parameters of interest for a device based on a set of display capabilities specified in a data messages (e.g., login, session login, settings, and/or control messages) received from the device. Additionally or alternatively, the device is configured to select the set of parameters of interest and provide a data message that specifies the set of parameters of interest to the second processing circuit.

In some embodiments, the interface circuit and/or the second processing circuit are configured to update analytics result data for active subscriptions in response to updated call/data metrics generated by the first processing circuit. The subscriptions can expire after a period of time and may be terminated upon the loss of an active connection from a corresponding device. In different implementations, analytics result data for active subscriptions may be updated in real-time as call/data metrics are updated or may be updated intermittently (e.g., hourly, daily, monthly, and/or yearly).

In some implementations, active subscriptions may be modified during operation. For example, subscription for a device may be updated in response to environmental changes (e.g., changes in connection bandwidth and/or location), user activity, and/or call/network activity. As an illustrative example, a device, interface circuit, and/or call data processing circuit may be configured to modify a subscription for a device in response to a set of criteria being satisfied. For instance, a subscription may initially be configured for generation of high-level analytics data (e.g., summery data). If a set of criteria indicative of a particular problem (e.g., network failure) is satisfied, the device, interface circuit, and/or call data processing circuit may be configured to modify the subscription for generation of analytics data relevant to diagnosis and/or resolution of the detected problem.

In some implementations, an application executing on a device may be configured to automatically detect one or more display capabilities of the device. Additionally or alternatively, one or more display capabilities may be manually defined by a user (e.g., via a graphical user interface on the device).

For ease of explanation, the examples are also primarily described with reference to analysis of call summary metrics for calls routed by an IPBX server. However, the embodiments are not so limited. Rather, some disclosed aspects may be applicable to methods, systems, and apparatuses that provide various types of data that may be used for generating analytics data.

Turning now to the figures, FIG. 1 shows an example communication system configured in accordance with one or more embodiments. The system 100 includes an IPBX server 110 configured to route VoIP calls for VoIP-enabled devices communicatively coupled to the IPBX server 110 via a network 130. The IPBX server 110 directs routing of calls, responsive to the call control commands received from the VoIP-enabled devices. The IPBX server 110 provides call event messages to indicate changes in statuses of the pending calls to VoIP-enabled devices of end-users who are active participants in the call.

The communication system 100 also includes a call data processing circuit 120 configured to receive the call event messages generated by the IPBX server 110. The call data processing circuit 120 is configured to evaluate the call events according to display-dependent subscriptions generated by interface circuit 180 for devices 140 and 150 connected via network 130. The display-dependent subscriptions cause the call data processing circuit 120 to generate analytics data that is customized based on display capabilities (e.g., screen size) of the devices 140 and 150. Use of display dependent subscriptions of active devices avoids unnecessary processing and/or communication of analytics data by the analysis circuit that will not be utilized and/or displayed by any of the devices.

Call data processing circuit 160 shows an example implementation of the call data processing circuit 120. In this example, the call data processing circuit 160 includes a first processing circuit or module (metrics generation circuit 162) configured to generate various call summary metrics from the call events received from the IPBX server 110. The call summary metrics indicate various statistics characterizing the call and/or end-user participation. These statistics may include, for example, call participants, a number of incoming calls, a number of outgoing calls, a number of answered calls, a number of missed calls, a number of abandoned calls, average call time, average time to answer, average on-hold time, or combinations thereof. In some embodiments, the metrics generation circuit 162 may generate additional data metrics characterizing other data parameters (e.g., address events for devices, statuses/presence of end-users, and/or use of network application) based on events received from secondary data sources 170 (e.g., network devices, applications utilized by the end-users in the IPBX, internet-connected data repositories, and/or third-party data subscription services). Events received from secondary data sources 170 may include, for example, endpoint registration events (e.g., connectivity detection), extension status events (e.g., DND, Busy, or ON call), presence events, call quality events (e.g., indicating latency, throughput, number of dropped packets, average and/or number of bits in error), virtual meeting summary events, SMS events, and/or system alarm events (e.g., indicating call loop, high CPU load, or rogue media traffic).

The metrics generation circuit 162 may utilize various processes to generate call summary metrics and/or other data metrics from received data. In some embodiments, the metrics generation circuit 162 may implement a processing engine to consume various types of events (e.g., call events, address events, and/or status events) from some event bus (e.g. Kafka) and generate data metrics. For example, the metrics generation circuit 162 may implement respective KAFKA event stream processes to consume and process different types of events. For further information regarding generation of call summary and/or data metrics, reference may be made to U.S. application Ser. No. 14/725,878, entitled "MODELING AND ANALYSIS OF CALLS IN IPBX", which is fully incorporated by reference herein.

The call data processing circuit 160 also includes an analysis circuit 164 configured to evaluate the call summary and/or data metrics according to display-dependent subscriptions received from the interface circuit 180. In response to receiving a display-dependent subscription for one of the devices, the analysis circuit 164 subscribes the device to a respective set of parameters of interest. The analysis circuit 164 analyzes the call/data metrics for the set of parameters of interest to produce a set of result data including a customized set of analytics data and communicates the set of results data to the device. In some implementations, the call data processing circuit 160 is configured to communicate the result data to the device via the interface circuit 180. Alternatively or additionally, the call data processing circuit 160 may communicate the result data (or a portion thereof) to the device via a network connection that bypasses the interface circuit 180.

While the subscription is active, the analysis circuit 164 updates the set of analytics data based on new call/data metrics generated by the metric generation circuit 162 and communicates changes to the analytics data to the device. Subscriptions may expire after a period of time or may be terminated upon the loss of an active connection from a corresponding device. Some example processes for evaluating call summary and/or data metrics for a device according to display-dependent subscriptions are described in more detail with reference to FIGS. 2-4.

In different embodiments, the analysis circuit 164 may be configured to update analytics data with various frequencies. In some implementations, the devices 140 and 150, the interface circuit 180, and/or the analysis circuit 164 may be configured to update the analytics data for active subscriptions in real time or on demand as new call/data metrics are generated by the metrics generation circuit 162. Additionally or alternatively, the devices 140 and 150, the interface circuit 180, and/or the analysis circuit 164 may be configured to update the analytics data for active subscriptions intermittently. For instance, analytics data may be updated periodically after a specified period of time (e.g., every minute, hourly, daily, monthly, and/or yearly). In some implementations, the analysis circuit 164 may be configured to provide and/or update the analytics data for an active subscription in response to detection of an event (e.g., detection of new end-users/devices and/or receipt of new subscription requests. In some implementations, a subscription request may be configured to cause the analysis circuit 164 to provide an alert message to a user in response to data metrics satisfying a set of alert criteria specified by the subscription request. The alert criteria may be specified as a function of various data metrics generated by the metrics generation circuit 162. In some implementations, alert messages may be provided to the device from which the subscription request was received. Additionally or alternatively, an alert message may be provided to a user/device specified in the subscription request. Alert messages may be provided using a number of different types of messages. For instance, in some implementations, the analysis circuit 164 is configured to provide an SMS text message notification to one or more telephone numbers indicated in the subscription request when the alert criteria is satisfied. In some implementations, the analysis circuit 164 is configured to send an automated voice call to the telephone number(s). In some embodiments, the analysis circuit 164 is configured to send an email notification to an email address indicated in the subscription request. In some embodiments, alert messages are provided using other messaging services (e.g., Facebook, MySpace, Twitter, and/or Instant Messengers). In some implementations, multiple notifications are sent to multiple recipients and/or use multiple types of messages.

In some embodiments, analytics data may be updated at the same frequency for all active subscriptions. In some other embodiments, the analysis circuit 164 may be configured to update analytics data for different active subscriptions at different frequencies. Frequency that analytics data is to be updated may be specified, for example, in a subscription request received from the interface circuit 180.

The analysis circuit 164 may evaluate the call/data metrics for parameters of interest using various analytics algorithms. In some implementations, analysis circuit 164 may evaluate the call/data metrics for a parameter of interest using a machine learning algorithm (e.g., an evolutionary algorithm). The machine learning algorithm may be evaluated and adjusted in a training process to improve performance and/or accuracy of algorithm. Training may include supervised learning, which manually assesses performance or selects modifications, or may include unsupervised learning, which automatically assesses performance of different variations of the algorithm. In some implementations, the analysis circuit 164 may be configured to continue to adjust the algorithm during operation. For example, the analysis circuit 164 may be configured to perform requested analytic operations using a current algorithm and also with one of more variations of the algorithm. Data from the current algorithm may be used as the result of the analytical operation. Data from the variations of the algorithm may be compared to the current algorithm to determine if any improvement is achieved. If a variation of the algorithm outperforms the current algorithm for a threshold number of data sets, the analysis circuit 164 may select the variation to be used as the current algorithm.

The call data processing circuit 120 can include one or more (computer) processing circuits that are configured to carry out call processing functions. For instance, one or more computer processor circuits can be configured to carry out the specific functions described in connection with individual blocks 162 and 164, or a single computer processor circuit can be configured to do the same. In some implementations, the call data processing circuit includes a load balancer logic circuit configured to dynamically distribute processing functions among multiple processing circuits, so as to best utilize combined CPU/cache resources of the call data processing circuit.

In some embodiments, the call data processing circuit 160 may also be configured to function as a service platform for third-party users to retrieve different types of metrics: call summary, call quality, device registration, user activity status, etc. For example, the call data processing circuit may maintain current values for various data metrics and/or sets of result data in a database. The data may be retrieved from the database by third parties using, for example, database queries (e.g., SQL queries). In some implementations, the call data processing circuit 160 may apply authentication and authorization techniques to restrict access to the database.

Figure 2:
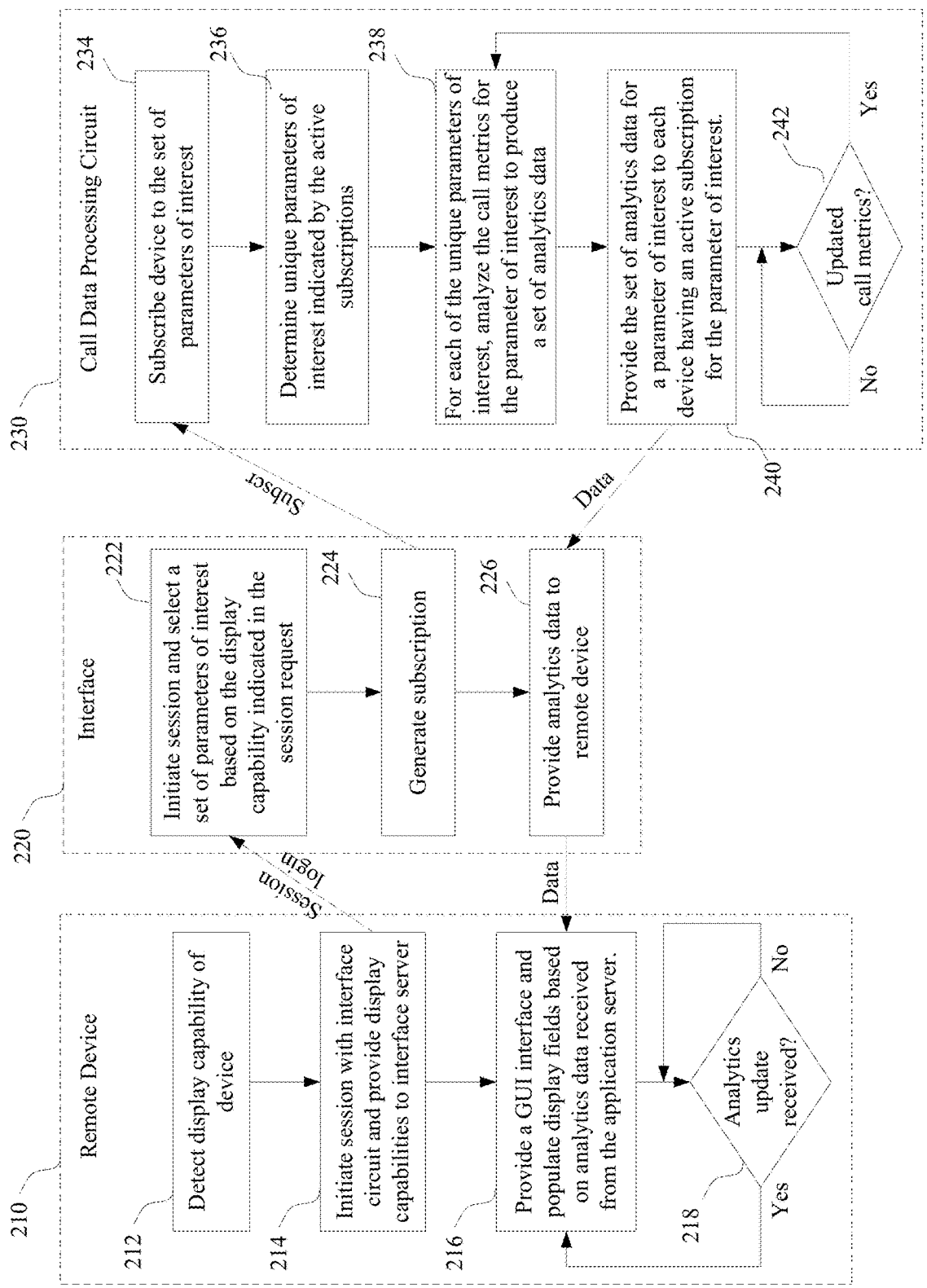
FIG. 2 shows a first example process for providing analytics data for display-dependent subscriptions of remote devices; consistent with one or more embodiments.

FIG. 2 shows an example process for providing device specific analytics data to a remote device. Block 210 shows operations of the processes that are performed by an application executing on a device (e.g., 140 or 150). Block 220 shows operations that are performed by an interface circuit (e.g., 180). Block 230 shows operations of the processes that are performed at a call data processing circuit (e.g., 120). At block 212, display capabilities of the device are detected. At block 214, data message(s) (e.g., session login, settings, and/or control data) are provided to the interface circuit 180 to initiate a session and indicate display capability of the device. At block 222, the session is initiated and a set of parameters of interest are selected by the interface circuit 180 based on the indicated display capabilities. At block 224, the interface circuit 180 generates a subscription request to subscribe the device to the selected parameters of interest.

At block 234, the call data processing circuit 120 subscribes the device to the set of parameters of interest. At block 236, the call data processing circuit determines unique parameters of interest indicated by active subscriptions. For each of the unique parameters of interest, call metrics are analyzed for the parameter of interest at block 238 to produce a set of analytics data. At block 240, the call data processing circuit 120 provides the set of analytics data for a parameter of interest to each device having an active subscription for the parameter of interest. In this example, the data is communicated to the device(s) via the interface circuit 180. At block 226, analytics data received from the call data processing circuit 120 is communicated to each device having an active subscription for the parameter of interest. At block 216, display fields of a GUI are populated based on analytics data received from the call data processing circuit.

In some implementations, if call metrics are updated, decision block 242 directs the process to analyze the updated call metrics for each unique parameter at block 238 and provides updated analytics data for a parameter of interest to devices having active subscriptions for the parameter at block 240. When updated analytics data is received, decision block 218 directs the process back to block 216, where display fields of the GUI are repopulated based on the updated analytics data.

Figure 3:
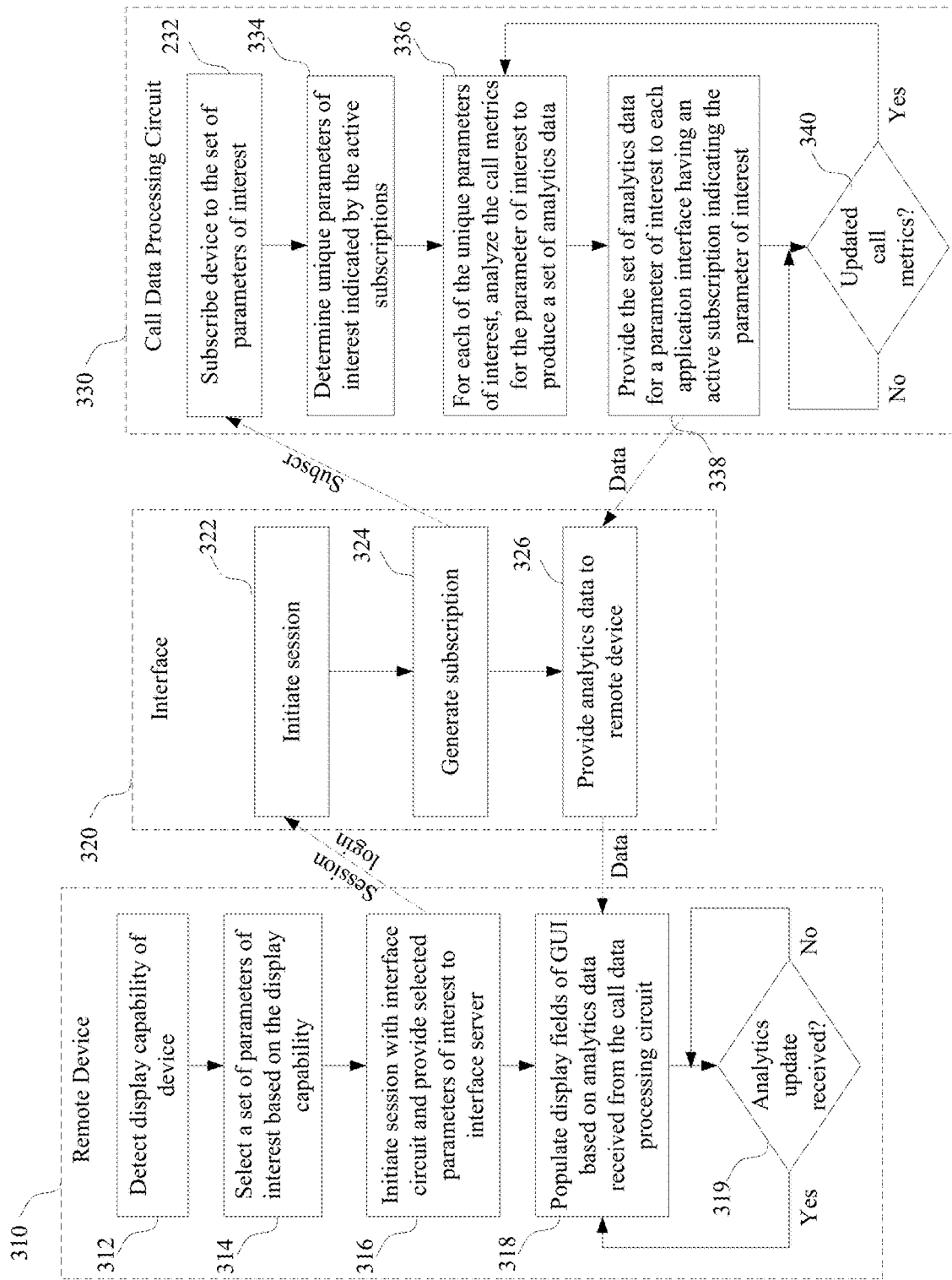
FIG. 3 shows a first example process for providing analytics data for display-dependent subscriptions of remote devices; consistent with one or more embodiments.

In some embodiments, the set of parameters of interest may be selected by a device rather than the call data processing circuit. FIG. 3 shows an example process for providing device specific analytics data to a remote device. Block 310 shows operations of the process that are performed by an application executing on a device (e.g., 140 or 150). Block 320 shows operations that are performed by an interface circuit (e.g., 180). Block 330 shows operations of the process that are performed at the call data processing circuit (e.g., 120). At block 312, display capabilities of the device are detected. At block 314, a set of parameters of interest are selected based on the detected display capabilities. At block 316, data message(s) (e.g., session login, settings, and/or control data) are provided to the interface circuit 180 to initiate a session and indicate the selected parameters of interest. At block 322, the session is initiated with the device. At block 324, a subscription request indicating the parameters of interest is sent to the call data processing circuit.

At block 332, the call data processing circuit 120 subscribes the device to the set of parameters of interest indicated in the subscription request. At block 334, the call data processing circuit 120 determines unique parameters of interest indicated by active subscriptions. For each of the unique parameters of interest, call metrics are analyzed for the parameter of interest at block 336 to produce a set of analytics data. At block 338, the call data processing circuit 120 provides the set of analytics data for a parameter of interest to each device having an active subscription for the parameter of interest. In this example, the data is communicated to the device(s) via the interface circuit 180. At block 326, analytics data received from the call data processing circuit 120 is communicated to each device having an active subscription for the parameter of interest. At block 318, the device populates display fields of a GUI based on the analytics data received from the call data processing circuit.

In some implementations, if call metrics are updated, decision block 340 directs the process to analyze the updated call metrics for each unique parameter at block 336 and provide updated analytics data for a parameter of interest to devices having active subscriptions for the parameter at block 338. When updated, analytics data is received by the device, and decision block 319 directs the process back to block 318, where display fields of the GUI are repopulated based on the updated analytics data.

Figure 4:
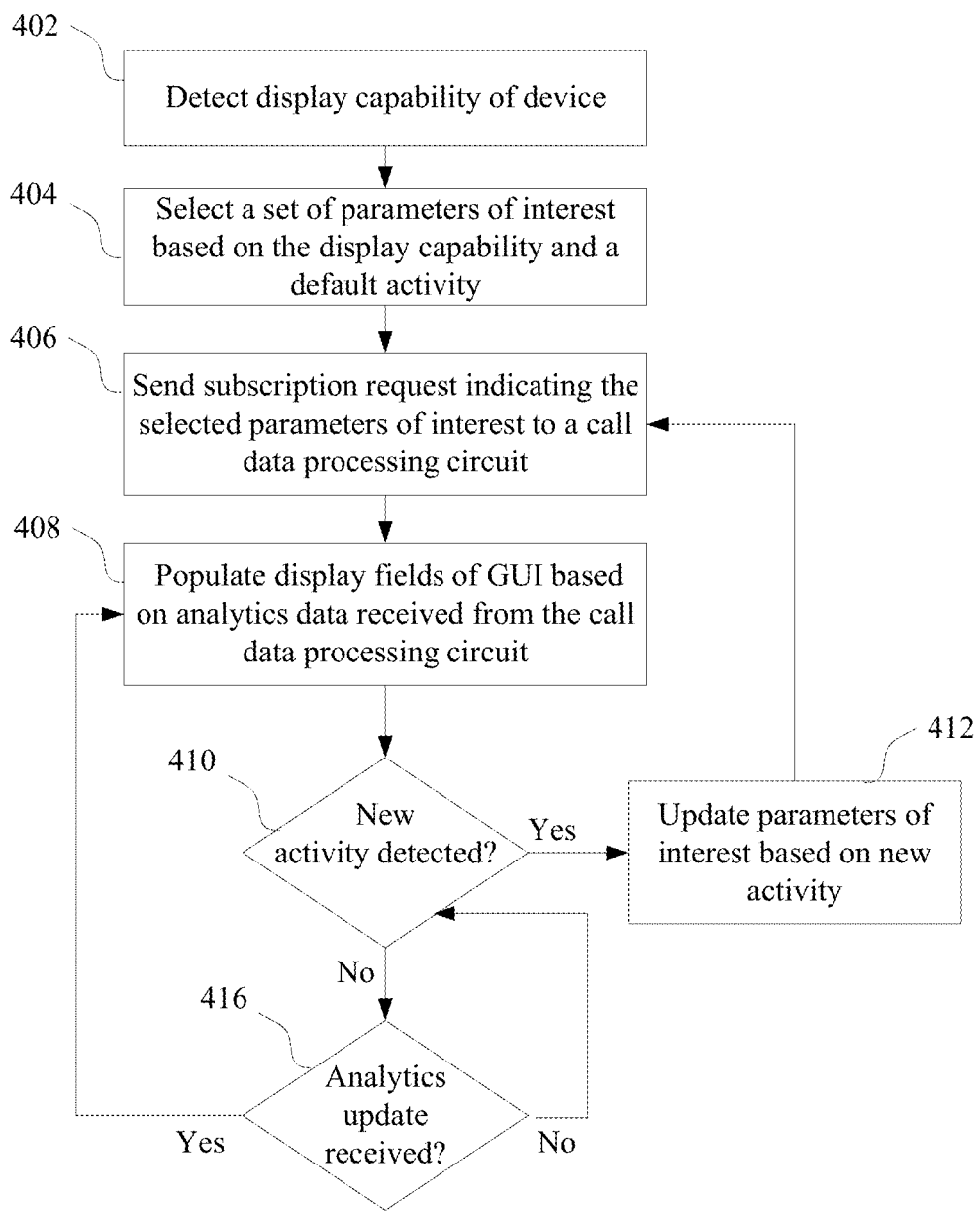
FIG. 4 shows an example process for modifying display-dependent subscriptions during operation of a remote device.

In some embodiments, subscriptions may be modified during operation of the device, for example, based on environmental changes and/or user activity of the device. FIG. 4 shows an example process for dynamic configuration of a subscription during operation of a device, consistent with one or more embodiments. At block 402, display capability of the device is detected. At block 404, a set of parameters of interest are selected based on the display capabilities and a default activity. The default activity may be specified, for example, in a user settings file stored in memory of the device. At block 406, a subscription request indicating the selected set of parameters is sent to a call control processing circuit. At block 408, display fields are populated based on analytics data generated for the set of parameters indicated in the subscription request. While no new activity is detected, decision block 410 directs the process to decision block 416. If new analytics data is received, decision block 416 directs the process to repopulate display fields of the GUI with the new analytics data at block 408. Otherwise, the process loops back to decision block 410. If new activity is detected, decision block 410 directs the process to update the selected parameters of interest based on the new activity. After updating the parameters of interest, a new subscription request, indicating the updated parameters of interest, is sent to the call data processing circuit at block 406. When analytics data for the updated parameters of interest is received, display fields of the GUI are repopulated with new analytics data at block 408.

As an illustrative example, the user settings may initially cause an application to generate a subscription request(s) for retrieval and intermittent update of a company-wide analytics data summary and for alert if high call traffic is detected. During operation of the application, an alert may be received indicating that a customer service department is experiencing high call traffic. In response to the alert and/or user input, the application may update subscription request(s) for retrieval of call analytics data for the service department in real-time. As another example, user settings may cause an application to update subscription request(s) based on geo-location of a device running the application. For instance, subscription request(s) for a device used by a network technician may be automatically updated for retrieval of call related diagnostics in a particular branch/department in which the technician is located. As yet another example, user settings may cause an application to update the frequency at which analytic updates are received based on detected user activity on the device. For instance, when the application detects interaction by a user (e.g., via keyboard, mouse, or touch screen input), the application may configure subscription request for real time update of analytics data and/or alerts. When the application detects infrequent interaction by a user (e.g., specified period of time without input by keyboard, mouse, or touch screen input), the application may reconfigure subscription requests for intermittent update of analytics data and/or alerts.

In different embodiments, the determined display capabilities of a device may affect various characteristics of the analysis that is performed for the device. For example, the display capabilities may control the number and/or selection of parameters to be determined from analysis of call data for an IPBX. As another example, the display capabilities may control the number and/or selection of end-users, extensions, groups, and/or departments in the IPBX, whose calls are to be used for the analysis. As another example, the display capabilities may control the number of calls to be used for analysis of a particular parameter. Additionally or alternatively, display capabilities may determine a period of time for which calls are to be analyzed for a particular parameter and/or the number of data points to be analyzed in the period of time.

Figure 5:
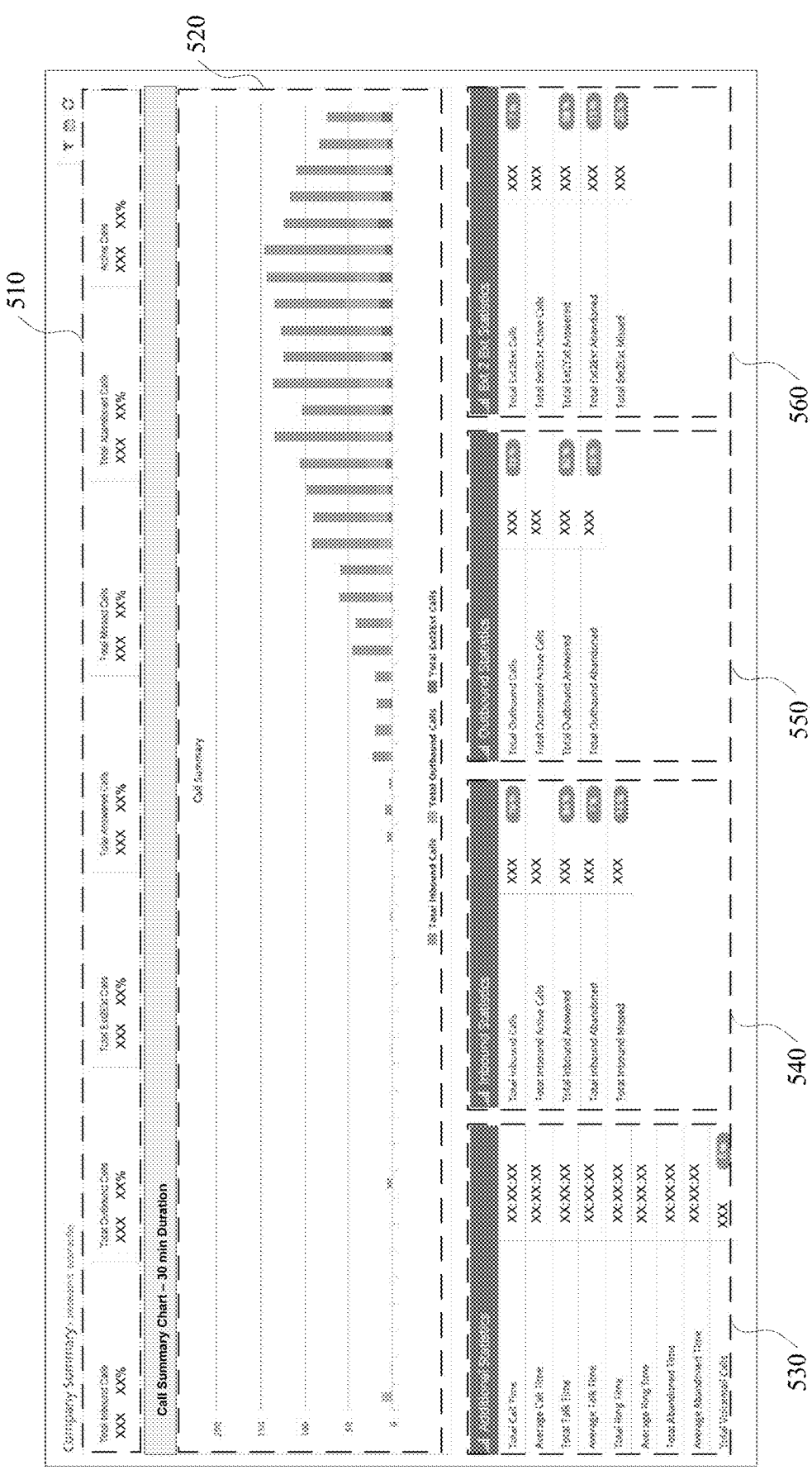
FIG. 5 shows an example graphical user interface (GUI) for displaying analytics data for calls in an IPBX on a desktop display, consistent with one or more embodiments.
Figure 7:
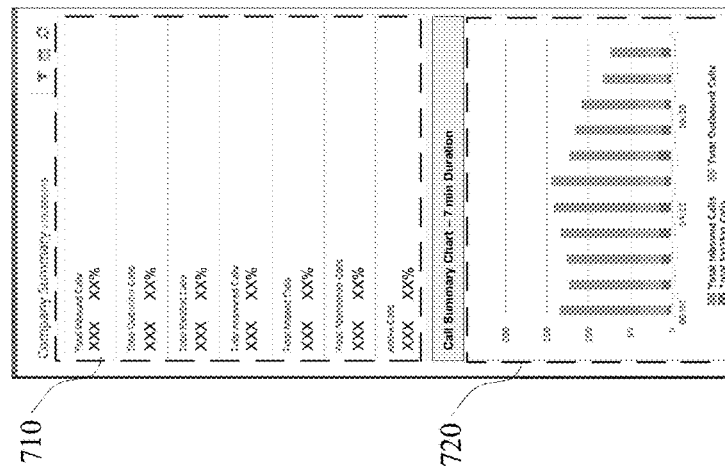
FIG. 7 shows an example graphical user interface (GUI) for displaying analytics data for calls in an IPBX on a smartphone display, consistent with one or more embodiments.
Figure 6:
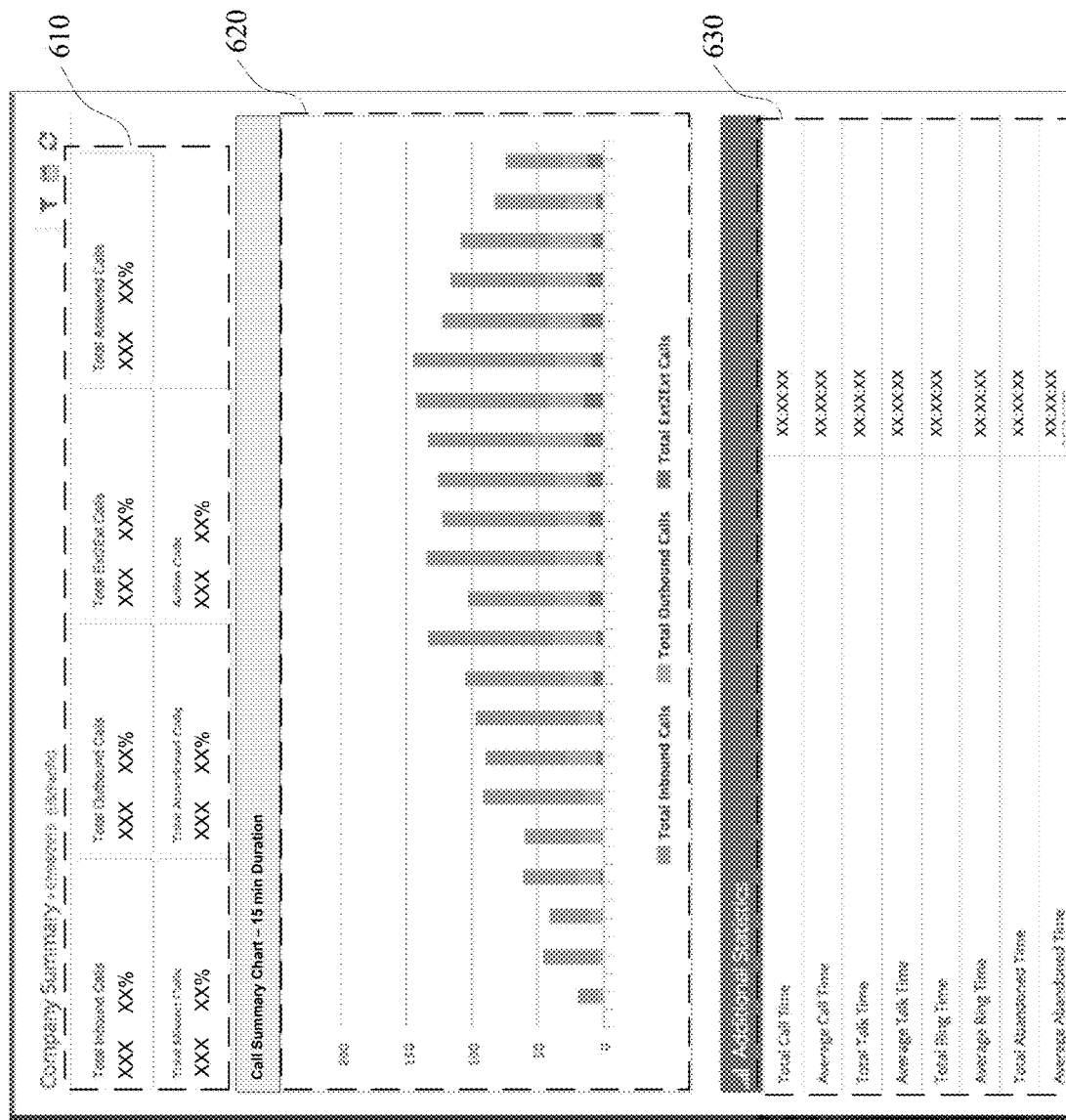
FIG. 6 shows an example GUI for displaying analytics data for calls in an IPBX on a notebook display, consistent with one or more embodiments.

As previously described, devices may be subscribed to different parameters of interest based on the display capabilities of each device. FIGS. 5, 6, and 7 illustrate example graphical user interfaces (GUIs) that may be provided for display of analytics data generated for different display capabilities. FIG. 5 shows a screen shot of the GUI provided for an analytics application operating on a larger display (e.g., a desktop computer). FIG. 6 shows an example GUI for displaying analytics data for calls in an IPBX on a medium sized display (e.g., a tablet computer). FIG. 7 shows an example GUI for displaying analytics data for calls in an IPBX on a smaller-sized display (e.g., a smartphone or personal assistant device). For ease of explanation FIGS. 5, 6, and 7 are discussed together to highlight how receipt and display of analytics data may be affected by display capabilities of the devices in some various embodiments.

In this example, the GUIs are each configured to display a summary of company-wide call analytics in blocks 510, 610, and 710. In this example, the company wide summary specifies total inbound calls, outbound calls, extension-to-extension calls, answered calls, missed calls, abandoned calls, and active calls. In this example, the same call statistics are displayed in blocks 510, 610, and 710. In some implementations, the GUIs for smaller screen devices number (e.g., FIGS. 6 and 7) may display fewer call statics in blocks 610 and 710 or may omit blocks 610 and 710.

Block 520 displays a graphical representation of various call statistics (e.g., inbound calls, outbound calls, and/or extension-to-extension calls) over time. In this example, the period of time for which call statistics are displayed is adjusted based on screen size. For instance, block 520 is configured to display statistics for calls occurring over a 30 minute period. In contrast, block 620 is configured to display statistics for calls occurring over a 15 minute period and block 720 is configured to display statistics for calls occurring over a 7 minute period. Additionally or alternatively, the number of data points of the graphical representation may be adjusted based on screen size of the device. For example, a larger screen GUI may display statistics for calls occurring over a 10 minute period with 100 data points whereas a smaller screen GUI may display statistics for calls occurring over the 10 minute period with only 10 data points.

The larger screen GUIs shown in FIGS. 5 and 6 display a number of call statistics for the company's various additional statistics in blocks 530 and 630, in addition to those shown in FIG. 7. In this example, the additional statistics indicate total call time, average call time, average talk time, average ring time, total time for abandoned calls, average time for abandoned calls, and total voice mail calls. However, various other statistics may be displayed in addition to or in lieu of those shown in blocks 530 and 630. For example, blocks 530 and 630 may be configured for display of analytics data for a particular department specified in user settings.

When an application is executed on a smaller screen device (e.g., as shown in FIG. 7), a subscription request is configured so analytics are only performed for data to be shown in blocks 710 and 720. Accordingly, unnecessary analysis of data to generate statistics (e.g., block 630) that will not be displayed can be avoided.

In this example, the desktop GUI shown in FIG. 5 displays various additional statistics in blocks 540, 550, and 560, in addition to those shown in FIGS. 6 and 7. In this example, call analytics are individually specified for inbound calls, outbound calls, and extension-to-extension calls in respective blocks 540, 550, and 560. Alternatively or additionally, one or more blocks may specify call statistics for individual users, extensions, groups, departments, and/or organizations. In this example, block 540 specifies a cumulative number of inbound calls, a current number of active inbound calls, a number of answered inbound calls, and a total number of missed inbound calls. Block 550, specifies a cumulative number of outbound calls, a current number of active outbound calls, a number of answered outbound calls, and a number of unanswered outbound calls. Block 560 specifies a cumulative number of extension-to-extension calls, a current number of active extension-to-extension calls, a number of answered extension-to-extension calls, and a total number of missed extension-to-extension calls.

The data fields of FIGS. 5, 6, and 7 are provided for explanatory purposes. In various embodiments, a GUI may be adapted to display various data fields in addition to or in lieu of the data fields shown in FIGS. 5, 6, and 7. For example, a GUI may be configured to display status of end-users and/or network resources (e.g., routers and/or VoIP servers) in an IPBX network.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in FIGS. 1, 2, 3, and 4. Similarly, it will be apparent that a server (e.g., providing a corresponding software platform), includes a computer processing circuit that is configured to provide services to other circuit-based devices.

Moreover, a VoIP-enabled circuit device includes processing circuits that are configured to establish VoIP communication sessions with other devices (e.g., personal computers, IP-enabled mobile phones, and tablet computers). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a Central Processing Unit (CPU) hardware-based circuit and a set of instructions in the form of firmware, in which the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. In a data-communications system including data-communications services provided to a plurality of client entities associated with a communications device with data communications circuitry for receiving the data-communications services over the Internet, a data-communications server to provide the data-communications services, the data-communications server comprising:

an interface circuit configured and arranged to generate a subscription request to subscribe the communications device, wherein the subscription request corresponds to a request for analytics data specified in connection with the subscription;

data processing circuitry, including a computer-processor circuit and memory circuitry, configured and arranged to:

generate summary metrics concerning communications routed to or from the communications device;

for at least one of a plurality of the data-communications services and for parameters of interest subscribed to by the communications device, evaluate the summary metrics for the parameter of interest to generate a respective set of analytics data;

send the analytics data to the communications device for display to a user of the communications device; and modify the parameters of interest subscribed to by the communications device in response to the analytics data for the communications device and generate and provide alerts in response to the analytics data satisfying a set of criteria specified by or on behalf of the communications device; and analysis circuitry to evaluate data associated with at least one of the parameters of interest in connection with the services subscribed to by the communications device and to execute a machine learning algorithm which is part of a process that is adjusted to improve performance or accuracy of the machine learning algorithm.

2. The data-communications server of claim 1, wherein the set of criteria are associated with an issue identified as being associated with the data-communications services, and the analytics data is relevant to the issue.

3. The data-communications server of claim 1, wherein the machine learning algorithm is adjusted as part of a machine-learning training process to improve performance or accuracy of the machine learning algorithm.

4. The data-communications server of claim 1, wherein the machine learning algorithm is adjusted as part of a machine-learning training process which is automated with unsupervised learning.

5. The data-communications server of claim 1, wherein the machine learning algorithm is adjusted as part of a machine-learning training process which includes supervised learning with manual assessment of performance.

6. The data-communications server of claim 1, wherein a set of criteria are specified with the subscription request, for specifying conditions for alerts to be conveyed to the communications device in response to the analytics data satisfying a set of criteria.

7. The data-communications server of claim 1, wherein the data processing circuitry is to transmit data for display associated with the communications device, the analytics data for display of parameters relevant to communications routed via the communications device.

8. The data-communications server of claim 1, wherein the data processing circuitry is configured and arranged to position or adjust a size of user interface components displayed on the communications device based on the display capabilities of the communications device.

9. The data-communications server of claim 1, wherein the data processing circuitry is configured and arranged to adjust an order of analytic components from the analytics data that are provided to the communications device, based on the display capabilities of the communications device.

10. The data-communications server of claim 1, wherein the data processing circuitry is to send data for display by a user of the communications device based on display capabilities including at least two of a screen size, a refresh rate, a screen resolution, and a communication bandwidth of the communications device.

11. In a data-communications system including data-communications services provided to a plurality of client entities associated with a communications device with data communications circuitry for receiving the data-communications services over the Internet, a method used by a data-communications server to provide the data-communications services, the method comprising:
    generating a subscription request to subscribe the communications device to at least some of the data-communications services, wherein the subscription request corresponds to a request for analytics data specified in connection with the subscription; and
    generating summary metrics concerning communications routed to or from the communications device, and including;
        for at least one of a plurality of the data-communications services and for parameters of interest subscribed to by the communications device, evaluating the summary metrics for the parameter of interest to generate a respective set of analytics data;
        sending the analytics data to the communications device for display to a user of the communications device;
        modifying the parameters of interest subscribed to by the communications device in response to the analytics data for the communications device and generating and providing alerts in response to the analytics data satisfying a set of criteria specified by or on behalf of the communications device; and
    via analysis circuitry, evaluating data associated with at least one of the parameters of interest in connection with the services subscribed to by the communications device and executing a machine learning algorithm which is part of a process that is adjusted to improve performance or accuracy of the machine learning algorithm.

12. The method of claim 11, wherein the set of criteria are associated with an issue identified as being associated with the data-communications services, and the analytics data is relevant to the issue.

13. The method of claim 11, further including analysis circuitry to evaluate data associated with at least one of the parameters of interest in connection with the services subscribed to by the communications device.

14. The method of claim 11, wherein the machine learning algorithm is adjusted as part of a machine-learning training process.

15. The method of claim 11, wherein the machine learning algorithm is adjusted as part of a machine-learning training process which is automated with unsupervised learning.

16. The method of claim 11, wherein the machine learning algorithm is adjusted as part of a machine-learning training process which includes supervised learning with manual assessment of performance.

* * * * *